United States Patent [19]

Takahashi et al.

[11] Patent Number: 5,424,100
[45] Date of Patent: Jun. 13, 1995

[54] COATING METHOD AND APPARATUS

[75] Inventors: Shinsuke Takahashi; Norio Shibata, both of Kanagawa, Japan

[73] Assignee: Fuji Photo Film Co., Ltd., Japan

[21] Appl. No.: 186,822

[22] Filed: Jan. 26, 1994

Related U.S. Application Data

[63] Continuation of Ser. No. 12,773, Feb. 3, 1993, abandoned.

[30] Foreign Application Priority Data

Feb. 5, 1992 [JP] Japan .................................. 4-047746

[51] Int. Cl.$^6$ .............................................. B05D 1/36
[52] U.S. Cl. ..................................... 427/402; 427/131;
427/356; 118/315; 118/410; 118/411
[58] Field of Search ........................ 427/402, 356, 131;
118/410, 411, 315

[56] References Cited

U.S. PATENT DOCUMENTS 4,854,262 8/1989 Chino et al. .......................... 427/356
5,069,934 12/1991 Chino et al. .......................... 427/131

FOREIGN PATENT DOCUMENTS 0431630 6/1991 European Pat. Off. .
0437210 7/1991 European Pat. Off. .
3733031 4/1988 Germany .

*Primary Examiner*—Shrive Beck
*Assistant Examiner*—David M. Maiorana
*Attorney, Agent, or Firm*—Sughrue, Mion, Zinn, Macpeak & Seas

[57] ABSTRACT

A coating method and a coating apparatus are constructed for simultaneously coating a plurality of different organic-solvent-based coating liquids each composed of a non-newtonian fluid having fine particles dispersed therein to form a multi-layered structure having three or more layers on a strip of continuously travelling non-magnetic supporting substrate with the aid of an extrusion type coating head. The coating liquids are instantaneously injected through the corresponding slits. The coating liquid for the lowermost layer is a non-magnetic liquid. The coated layers are successively formed one above another with the aid of a doctor edge plane located on the downstream side of each slit. The coating head is constructed such that each doctor edge plane does not pass a tangential line extending from the upstream end of an opening portion of each slit to a doctor edge of a slit located on the downstream side and that a coating liquid injected through a slit on the upstream side merges with a coating liquid injected through a slit on the downstream side while defining a predetermined merging angle therebetween.

8 Claims, 2 Drawing Sheets

COATING METHOD AND APPARATUS

This is a Continuation of application Ser. No. 08/012,773 filed Feb. 3, 1993 abandoned.

BACKGROUND OF THE INVENTION

The present invention relates generally to a method for producing a magnetic recording medium. More particularly, the present invention relates to a coating method and a coating apparatus for simultaneously coating a plurality of different organic-solvent-based non-magnetic coating liquids or magnetic coating liquids on a strip formed of a continuously moving non-magnetic substrate to form a multi-layered structure on the substrate by successively laminating the coating liquids.

In recent years, the requirement for recording of various information on a magnetic recording medium having a reduced thickness at a higher density has increased. In view of this recent trend, a single magnetic layer coated on a strip of non-magnetic supporting material is being replaced by a multi-layered structure. This is because a magnetic recording medium having a magnetic layer formed in a multi-layered structure provides substantially improved magnetic recording properties in the form of an increase of a magnetic data storing capacity, compared with a magnetic recording medium having a magnetic layer formed in a single layer. In practice, the multi-layered structure is required to exhibit a sectional shape consisting of two to several layers.

A method for producing a magnetic recording medium having a multi-layered structure by repeatedly forming a coated layer and then drying the same one by one is disclosed, e.g., in Japanese Patent Publications Nos. 54-43362 and 58-43816 and Japanese Patent Laid-Open Publications Nos. 51-119204, 52-51908 and 53-16604.

With the foregoing conventional method, however, since the steps of coating and drying are repeatedly performed, the method is accompanied by low productivity, and, moreover, requires a large and expensive apparatus to implement. In addition, according to the conventional method, the magnetic recording elements are not arranged in correct alignment with each other along an interior boundary plane between adjacent coated layers, causing undesirable tape modulation noise or the like to be readily generated. Moreover, the adjacent layers do not sufficiently adhere to each other. The foregoing disadvantages arise from repeatedly performing the same forming step the same number of times as the number of layers to be coated, which itself results in low productivity.

On the other hand, a method for coating a coating liquid to form a multi-layered structure is employed when photosensitive materials, heat sensitive papers or the like are produced. In this connection, a phenomenon of transforming a sol of gelatin into a gel of the same by adjusting the temperature of the coating liquid is utilized for producing photosensitive materials. In this case, the viscosity of the coating liquid can easily be determined corresponding to the sol state most suitably employed during each coating operation as well as the preferred gel state during each drying operation. In the case where a sheet of paper is used as a supporting substrate, moisture in the coated layer is absorbed by the paper no matter how much the viscosity of the coating liquid is reduced during each coating operation. Thus, the coating liquid becomes more viscous after completion of the coating operation, such that unwanted disturbances of the coated layer in the course of subsequent coating operations is reliably prevented.

If a newtonian fluid is used as the coating liquid for heat sensitive materials and photosensitive materials as mentioned above, its physical properties largely vary depending on the static viscosity (which can easily be determined by the composition of the coating liquid). Moreover, the viscosity of the coating liquid can be comparatively easily adjusted in the above-described manner. Thus, plural coating liquids can simultaneously be coated on the supporting substrate to form a multi-layered structure.

However, a magnetic coating liquid serving as a magnetic recording medium is a non-newtonian fluid, its viscosity varying coating operations depending on various conditions. This makes it very difficult to properly control the physical properties of the magnetic coating liquid attributable to the viscosity of the liquid. Thus, whether or not the aforementioned problem can be overcome when the viscosity of the coating liquid is adjusted depending upon the operative conditions is greatly dependent upon the skill and experience of the operator. In the circumstances as mentioned above, it is very difficult to assure that each coating operation can be achieved at a high productivity while maintaining a more stable quality than in the conventional coating method.

In view of the circumstances as mentioned above, a method for forming a coated layer with a multi-layered structure with only a single coating step or with continuous coating steps has already been proposed and employed in practical use. However, with respect to the coating method disclosed, e.g., in Japanese Patent Laid-Open Publication No. 62-124631 as a method for simultaneously coating a plurality of different coating liquids to form a plurality of magnetic layers with a multi-layered structure, when an organic-solvent-based non-magnetic coating liquid and a magnetic coating liquid or two kinds of magnetic coating liquids are simultaneously coated to form a multi-layered structure, color fluctuation and longitudinally extending stripes are liable to occur when the coating operations are performed at a low speed, compared with the conventional method wherein coating and drying steps are sequentially repeated. Thus, there are problems with the formation of a multi-layered structure according to this method in that the quality of the coated product is remarkably degraded with respect to the electromagnetic conversion properties and appearance, and a coating liquid on the upper layer side cannot be uniformly coated on the lower coated layer, resulting in the two layers failing to be properly formed, depending on the procedure of preparing the coating liquids. Moreover, the coating liquid forming the upper layer cannot completely be coated on a coated layer serving as a lower layer. These problems worsen as the quantity of each coating liquid is reduced (i.e., coating is achieved to form a thinner layer).

In addition, an apparatus for simultaneously coating a plurality of different coating liquids to form a plurality of layers is disclosed in, e.g., Japanese Patent Laid-Open Publications Nos. 58-109162 and 63-88080.

With the coating apparatus disclosed in Japanese Patent Laid-Open Publication No. 63-88080, the liquid disturbance between adjacent layers can be reduced, and the degree of freedom in selecting coating liquids prior to simultaneous coating of the coating liquids to form a plurality of layers can be increased, even though physical properties of one coating liquid differ considerably from those of another coating liquid. However, due to the trend of recording information on a magnetic recording material at ever-increasing densities, there arises a problem that as coating liquids are coated on a magnetic recording material to form three or more layers, a very thin coated layer, especially, an upper coated layer having a thickness of, e.g., about 1.0 $\mu$m or less cannot be stably formed because of a phenomenon whereby coated liquid is spattered away from the lower coated layer.

In view of the foregoing problem, a method for forming a recording layer serving as a magnetic recording medium having a very small thickness wherein a dummy layer is used as a means for increasing the thickness of a coating liquid applied during each coating operation and for reducing the thickness of a product of a coated recording layer has been developed. Specifically, according to the developed method, a dummy layer, i.e., a non-magnetic layer is used for the lower layer of the magnetic recording layer, and coating liquids are simultaneously coated to form a plurality of layers in such a manner as to allow the magnetic recording layer to be placed on the dummy layer.

However, the dummy layer and the non-dummy layer have a thixotropic nature, and, moreover, a difference of physical properties specific to the thixotropic nature appears between both the layers, causing physical properties (apparent viscosity or the like) specific to these coating liquids to differ largely from each other under substantially the same conditions. Thus, it has been found that the behavior of each coating liquid varies depending on the liquid merging speed in the liquid merging region where the non-dummy layer is coated on the dummy layer so that undesirable states such as stripe-shaped coating, irregular coating, spattering of the coating liquid away from the lower layer or the like are liable to appear.

According to the approach disclosed in Japanese Patent Laid-Open Publication No. 58-109162 and illustrated in FIG. 6 therein, a coating apparatus for forming three coated layers is illustrated as a multi-layer coating apparatus. However, since the disclosed coating apparatus includes doctor edge planes each of which has a long length (corresponding to a length as measured in the direction of travel of a supporting substrate), it is presumable that the physical properties of each coating liquid vary due to a shearing force imparted to the coating liquid when the doctor edge plane has an excessively long length, resulting in the behavior of the coating liquid becoming unstable. In addition, it is known that each doctor edge plane has an optimum length specific to the coating apparatus which varies depending on the kind of coating liquid and coating conditions. Especially as each coating liquid is increasingly coated on the supporting substrate with a reduced thickness, it is required that the length of the doctor edge plane as measured in the direction of travel of the supporting substrate be reduced.

However, as described in Japanese Patent Laid-Open Publication No. 58-109152, when it is intended that the length of the doctor edge plane be reduced while respective slits extend in parallel with each other, an intermediate block interposed between adjacent slits (i.e., an intermediate block defining the slits) must be made thin, causing it to be readily flexed by an exterior force such as hydraulic pressure or the like exerted on it during a coating operation. Thus, there arises a problem that irregular coating is liable to be performed.

To solve the problem of irregular coating, the coating apparatus employs a mechanism for reducing the length of the doctor edge and increasing the mechanical strength of the intermediate block by inclining each slit in such a manner that the slits are collectively arranged at the forwardmost end of a coating head.

However, as the inclination angle of each slit increases, a coating liquid merging angle for causing the coated layer to extend in the direction of travel of the supporting substrate increases correspondingly. Thus, there arises a problem that the behavior of the coating liquid in the coating liquid merging region varies largely, resulting in the failure of achieving a thin coating layer.

In addition to the aforementioned merging angle, the coating apparatus is significantly affected by operative conditions in which each coating liquid has thixotropic physical properties and each coating layer is formed with a very small thickness. Thus, with the conventional coating method wherein a coating head is constructed with a merging angle determined based on the operator's experience, it is very difficult to form a plurality of coating layers each forming a thin layer on a mass production line.

Moreover, in the case where an orienting treatment is conducted for the magnetic layer after completion of a coating operation, when a coating liquid is coated on the supporting substrate with a very small thickness, a solvent contained therein is vaporized a very short time before the magnetic layer is dried. Thus, the solvent is dried to some extent before the coated magnetic layer is subjected to the orienting treatment, making it difficult to perform the orienting treatment, and when the orienting treatment is excessively progressively conducted, the magnetic properties of the magnetic recording medium become adversely affected in the form of deterioration of a magnetic orienting property of the magnetic recording medium.

As is apparent from the above description, in the case where coating liquids are coated on the supporting substrate to form multi-layers each having a very small thickness, the problems of color tone fluctuations across each coated layer due to deflection of the intermediate block in the coating head and the scattering of the coating liquid away from the coated layer are left unsolved. In addition, the problem whereby the orienting property of the magnetic recording medium is deteriorated even though the coating liquid is coated on the supporting substrate while forming multi-layers to some extent is left unsolved. For this reason, when a magnetic tape produced by practicing the conventional coating method under a condition where e.g., a magnetic dispersant is employed as a coating liquid is used as, e.g., a video tape, there arise problems that noise associated with video properties of the magnetic tape is generated, and, moreover, the image resolution of the magnetic tape is degraded.

SUMMARY OF THE INVENTION

The present invention has been made in consideration of the aforementioned difficulties, and an object thereof resides in providing a coating method and a coating apparatus which assure that an acceptable magnetic recording medium can be stably produced at a high speed while forming multiple layers, each having a reduced thickness, wherein the aforementioned problems arising when a thixotropic fluid is coated as a coating liquid on a supporting medium while instantaneously forming multi-layers, each having a small thickness, are completely eliminated. Also, the occurrence of color tone fluctuation and longitudinally extending stripes can effectively be suppressed, and deterioration of an orienting property of the magnetic recording medium can be suppressed.

According to one aspect of the present invention, there is provided a method for instantaneously coating a plurality of different organic-solvent-based coating liquids on a strip of continuously travelling non-magnetic supporting substrate with the aid of an extrusion type coating head to form a multi-layered structure having three or more layers, each of the coating liquids being a non-newtonian fluid having fine particles dispersed therein. The present method is characterized in that the coating liquids are injected through a plurality of slits, where a coating liquid for forming at least the lowermost layer is a non-magnetic liquid, and where the coating head does not include an edge plane which extends past a tangential line extending from the upstream end of an opening portion of each slit to a doctor edge of a slit located on the downstream side when each layer is successively laminated on the preceding layer with the aid of the doctor edge of the slit located on the downstream side. In addition, a coating liquid injected on the upstream side merges with a coating liquid injected on the downstream side with a merging angle of 165° or less so as to allow the coating liquids to be successively coated on the supporting substrate.

According to another aspect of the present invention, there is provided an apparatus for instantaneously coating a plurality of different organic-solvent-based coating liquids on a strip of continuously travelling non-magnetic supporting substrate with the aid of an extrusion type coating head to form a multi-layered structure having three or more layers, each of the coating liquids being a non-newtonian fluid having fine particles dispersed therein, wherein the apparatus is characterized in that each slit includes a doctor edge on the downstream side thereof so as to allow each of the different coating liquids to be independently injected through the slit. A merging angle defined by a tangential line extending from a doctor edge located at the upstream end of an opening portion of each slit to a doctor edge located on the downstream side and an extension line extending along the slit is set to 165° or less, and an angle defined by center lines of adjacent slits is set to 10° or more.

BRIEF DESCRIPTION OF THE DRAWINGS

The present invention will be described in accordance with the accompanying drawings, wherein.

DESCRIPTION OF THE PREFERRED EMBODIMENTS

Figure 1:
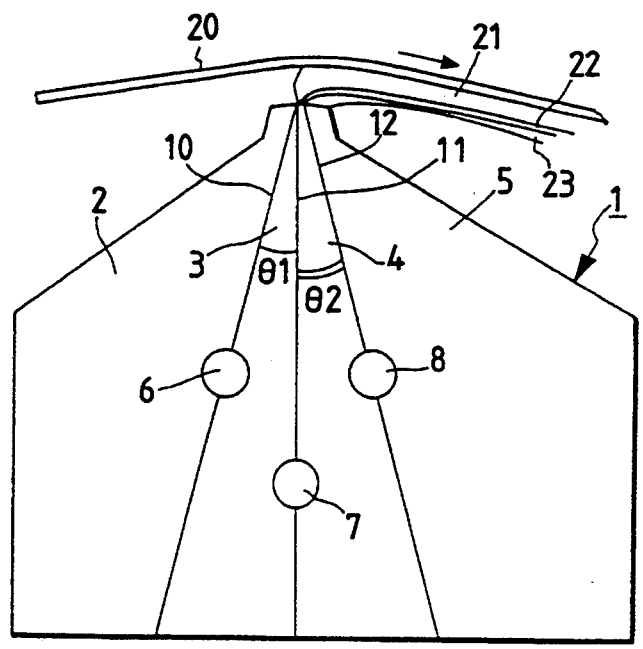
FIG. 1 is a schematic side view of a coating head for forming a coated layer having a three-layered structure at a coating step of a coating method in accordance with a preferred embodiment of the present invention.
Figure 2:
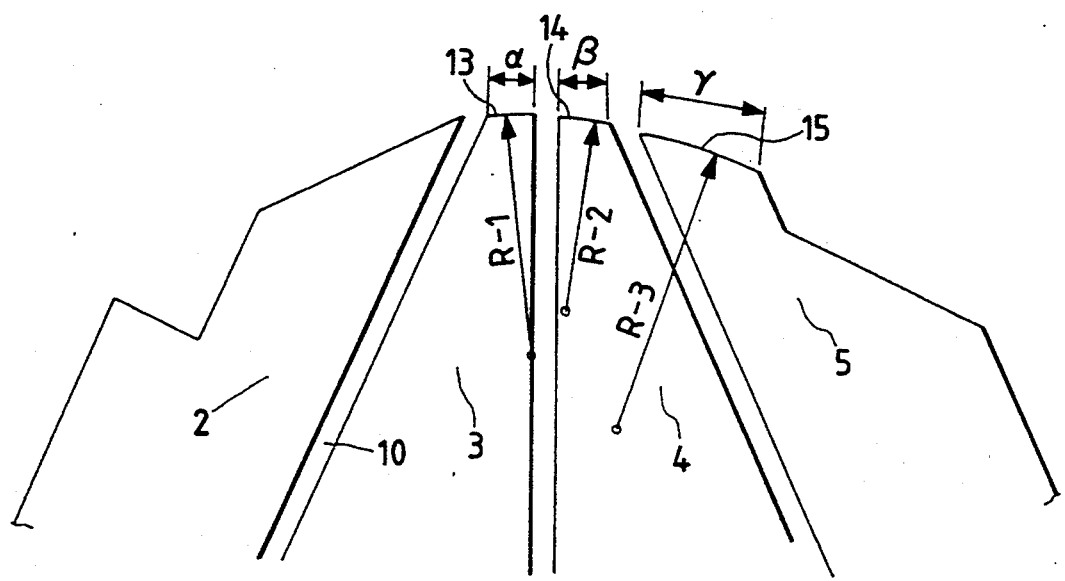
FIG. 2 is an enlarged side view of the coating head shown in FIG. 1, particularly illustrating the forwardmost end part of the coating head.
Figure 3:
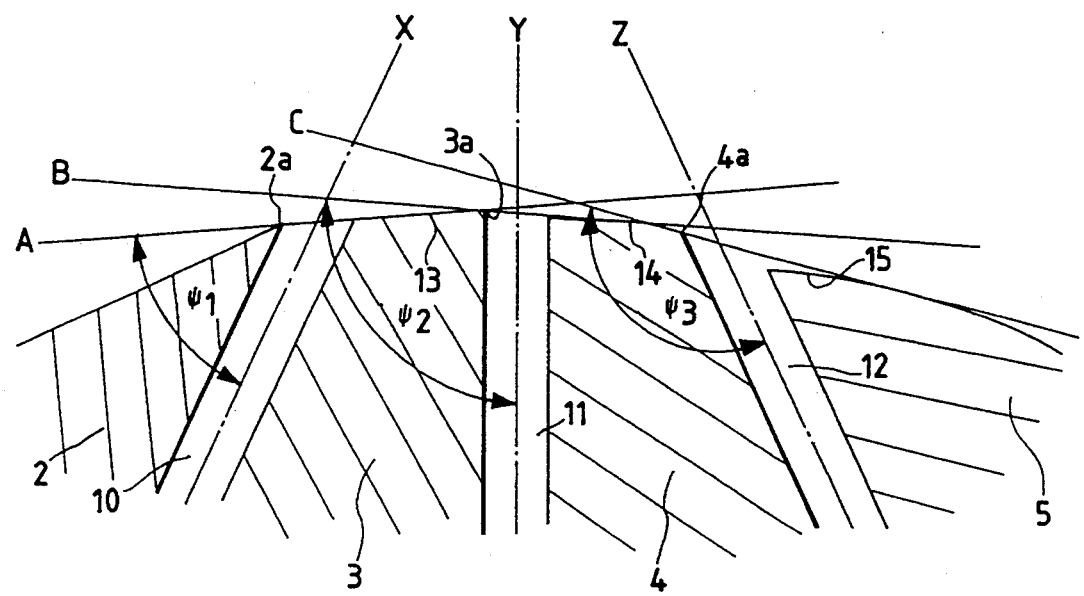
FIG. 3 is another enlarged side view of the coating head shown in FIG. 2, particularly illustrating the forwardmost end part of the coating head with a larger scale employed therefor.
Figure 4:
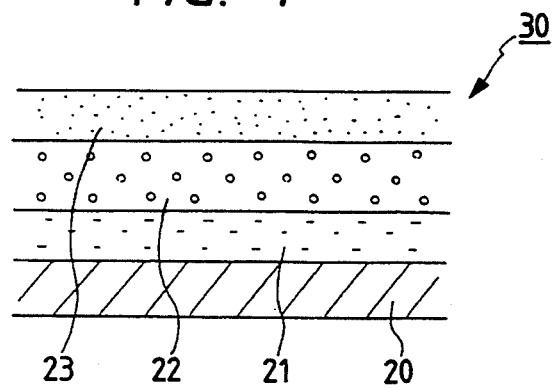
FIG. 4 is a sectional view of a coated layer formed by simultaneously coating plural types of coating liquids to form a multi-layered structure as well as a supporting substrate as viewed in the direction of a thickness of the coated layer.

The present invention will now be described in detail hereinafter with reference to FIGS. 1–4. FIGS. 1–3 illustrate by way of sectional views a coating apparatus for coating an organic-solvent-based coating liquid and a magnetic dispersant, and FIG. 4 is an enlarged sectional view of a magnetic recording medium produced employing the coating apparatus constructed in accordance with the preferred embodiment of the present invention.

FIG. 1 illustrates a sectional view of the structure of a coating head of the coating apparatus. The coating head is designated by reference numeral 1 and is an essential component constituting the coating apparatus for simultaneously coating three kinds of coating liquids 21, 22 and 23 on a strip of flexible supporting medium 20 molded of polyethylene terephthalate or the like to form a three-layered structure. The coating head 1 is constructed by four blocks, i.e., a first block 2, a second block 3, a third block 4 and a fourth block 5. Three slits 10, 11 and 12 are formed by three gaps between adjacent blocks, i.e., a first gap between the first block 2 and the second block 3, a second gap between the second block 3 and the third block 4 and a third gap between the third block 4 and the fourth block 5. The slit 10 is communicated with a first liquid reservoir 6, the slit 11 is communicated with a second liquid reservoir 7 and the slit 12 is communicated with a third liquid reservoir 8.

Generally, the viscosity of the foregoing type of coating liquid varies depending on the speed gradient, especially, with respect to rod-shaped rigid fine particles such as a magnetic substance, where the fine particles are arranged in alignment with each other with a certain orientation, causing flowing properties of the coating liquid to vary. In addition, the fine particles adhere together by the action of their cohesive force. This is especially true with magnetic powder which exhibits cohesiveness due to its magnetic attractive force. Thus, the apparent viscosity of the coating liquid is reduced in a high shear region (i.e., a region where the coating liquid is squeezed toward the supporting medium side by a doctor edge plane), whereby the rate of flow suitable for a coating operation can be generated with the coating liquid. However, when the foregoing operative state is maintained for a long time (i.e., when the doctor edge plane has a long length), the behavior of the coating liquid becomes turbulent. This leads to the result that a thin layer cannot be formed by increasing the rate of flow of the coating liquid. On the contrary, however, as the behavior of the coating liquid varies, there may arise a malfunction such that the coating ability of the coating liquid having a small thickness on the supporting medium is degraded. More particularly, when a plurality of coating liquids are coated to form a multi-layered structure on a supporting substrate, mixing occurs between adjacent layers of the coating liquids in the coating liquid merging region due to the difference of physical properties between the adjacent coating liquids caused by the difference of liquid composition between the same as the behavior of each coating liquid varies in the above-described manner. Moreover, the behavior of the whole coated layer becomes unstable. As a result, each coating liquid is irregularly coated on the supporting substrate and the uppermost coated layer is peeled away from the lower one. Thus, the behavior of each coating liquid is significantly effected not only by a difference of physical properties of one coating liquid from those of other coating liquid, but also by the length of each doctor edge plane and respective merging angles.

The inventor studied the inclination defined by adjacent slits and reached the conclusion that there is a certain limit with respect to the inclination angle. Specifically, the intermediate block includes a first doctor edge plane and a second doctor edge plane of which inclination angles are different from each other.

The mechanical strength of each of the second and third blocks 3 and 4 each serving as an intermediate block is reliably maintained while avoiding an undesirable deflection of the second and third blocks 3 and 4 during each coating operation, provided that the inclination angle $\theta_1$ of the slit 10 relative to the slit 11 is about 10° or more and the inclination angle $\theta_2$ of the slit 12 relative to the slit 11 is set to 10° or more.

Cemented carbide such as tungsten carbide or the like is employed as a material for the coating head 1. The width of the coating head 1 is set to 500 mm, a length of the slit 10 is set to 80 mm, the length of the slit 11 is set to 80 mm, the length of the slit 12 is set to 80 mm, and the inner diameter of each of the liquid reservoirs 6, 7 and 8 is set to 15 mm. The supporting substrate 20 is supported by a plurality of conveyance rollers (not shown) each extending across the supporting substrate 20 in a direction transverse to the direction of movement of the supporting substrate 20. The coating head 1 is located opposite to the supporting substrate 20 at a substantially right angle relative to the central slit 11 as if the former were thrust against the latter for the purpose of executing a coating step.

Doctor edge planes of the coating head 1 are constructed of a first doctor edge plane 13 for coating a first coating liquid to form the lowermost layer, a second doctor edge plane 14 for coating a second coating liquid, and a third doctor edge plane 15 for coating a third coating liquid. As shown in FIG. 2 in the enlarged state, each of the doctor edge planes 13, 14 and 15 is designed in the form of a curved plane having a predetermined radius of curvature. Specifically, R1, R2 and R3 representing the radius of curvature of each of the doctor edge planes 13, 14 and 15 are set to the range of 0.5 to 10 cm, and lengths of the doctor edge planes 13, 14 and 15, i.e., widths $\alpha$, $\beta$ and $\gamma$ of the same as seen in the direction of travelling of the supporting substrate 20, are set to the range of 0.3 to 5 mm. Since each of the doctor edge planes is designed to have a radius of curvature and a length in the above-described manner, each coating liquid can be extruded through the corresponding slit with an optimum hydraulic pressure to form a coated layer with the aid of the corresponding doctor edge plane while avoiding unnecessary liquid squeezing force against the supporting substrate 20 in excess of a predetermined liquid squeezing force.

In addition, as illustrated in FIG. 3 the inventor has conducted a variety of experiments with respect to merging angles $\Psi_1$, $\Psi_2$ and $\Psi_3$ defined by tangential lines A, B and C extending from upstream ends $2a$, $3a$ and $4a$ of opening portions of the slits 10, 11 and 12 to the doctor edge planes 13, 14 and 15 on the downstream side and center lines X, Y and Z of the slits 10, 11 and 12 and has reached the following conclusion.

Specifically, the merging angle $\Psi_1$ is defined by the center line X of the slit 10 and the tangential line A, and the tangential line A substantially coincides with the direction of travelling of the supporting substrate 20. Generally, the merging angle $\Psi_1$ is set to a certain angle which does not exceed 90°, whereby a first coating liquid 21 injected through the slit 10 can be stably coated on the supporting substrate 20 in the same manner as the conventional coating method.

The merging angle $\Psi_2$ is defined by the center line Y of the slit 11 and the tangential line B. The tangential line B substantially coincides with the direction of flow of the coating liquid 22 injected through the slit 11 toward the supporting substrate 20. It has been found that it is acceptable that the merging angle $\Psi_2$ be set in the range of about 90° to 165°. It can be presumed that the reason why the maximum merging angle $\Psi_2$ is set to an angle considerably larger than the angle which can experimentally be determined by any expert in the art consists in that a quantity of the coating liquid 22 injected through the slit 11 is very small compared with that in the conventional method (i.e., a coated layer having a very small thickness is formed), causing collision energy appearing in the merging region of the coating liquid 22 to be extremely small with the result that coating can be achieved even when the merging angle $\Psi_2$ is set to such a large angle as mentioned above.

Finally, the merging angle $\Psi_3$ is defined by the center line Z of the slit 12 and the tangential line C. The tangential line C substantially coincides with the direction of flow of the second coating liquid 22 injected through the slit 11 toward the supporting substrate 20 to form a coated layer on the supporting substrate 20. It has been found that it is acceptable that the merging angle $\Psi_3$ be set in the range of about 120° to 156°. Similar to the case of the merging angle $\Psi_2$ it can be presumed that the reason why the maximum merging angle $\Psi_3$ is set to an angle considerably larger than the angle which can be experimentally determined by any expert in the art consists in that the quantity of the coating liquid 23 injected through the slit 12 is very small, causing collision energy appearing in the merging region of the coating liquid 23 injected through the slit 12 to be extremely small, with the result that coating can be achieved even when the merging angle $\theta_3$ is set to a large angle.

As is apparent from the above description, coating can satisfactorily be achieved as long as each of the merging angles $\Psi_2$ and $\Psi_3$ is set to 165° or less.

A plurality of organic-solvent-based coating liquids each of which is a non-newtonian fluid having fine particles dispersed therein are coated on the supporting medium 20 so that a magnetic recording medium 30 having a three-layered structure as shown in FIG. 4 is produced. The magnetic recording medium 30 is constructed such that the coating liquids 21, 22 and 23 are successively coated on the supporting substrate 20. The coating liquid 23 constituting the uppermost layer forms a magnetic layer containing easily magnetizable metallic material powder so that the magnetic layer can serve as a layer suitable for recording a series of high frequency signals. For example, in the case of a magnetic tape or the like, a travelling property of the magnetic tape can be elevated by setting the content of the intensely magnetizable metallic material powder to a comparatively low value.

In contrast with the coating liquid 23, the coating liquid 22 does not form a layer serving as a surface layer. Thus, the layer constituted by the coating liquid 22 serves as a layer having a magnetizable material filled therein at a high density for maintaining excellent recording/reproducing properties of the magnetic tape without the necessity of taking into account the travelling property of the magnetic tape.

The coating liquid 21 constituting the lowermost layer contains inorganic material powder, e.g., titanium oxide powder, having an average particle size of about 0.05 μm. That is, the coating liquid 21 forms a non-magnetic layer which serves as a dummy layer for eliminating problems associated with coating properties and orienting properties which are attributable to the fact that the magnetic layer is formed with a very small thickness. In the aforementioned embodiment, inorganic powder is contained in the coating liquid 21 for the lowermost layer, and the latter is formed after completion of a drying operation. However, the present invention should not be limited only to this embodiment. Alternatively, the lowermost layer defined by the coating liquid 21 may be formed without any necessity for drying it.

As described above, the coating liquid 21 for the lowermost layer serves as a so-called dummy layer which makes it possible for the coating liquid 22 and the coating liquid 23 coated on the coating liquid 21 to form layers each having a very small thickness. The reason why the magnetic coating liquid can be coated on the supporting substrate 20 to form a magnetic layer having a very small thickness of 1.0 μm or less is that the coating liquid 23 is coated on the preceding coating layers 21 and 22, even in the case that the support substance 20 does not have excellent surface properties, whereby the supporting substrate 20 can exhibit substantially improved surface properties. Further, owing to the fact that in addition to a liquid sealing effect (effect for preventing air to be entrapped in the coated structure), the thickness of the overall assembly of coating liquids is increased in the emerging region where the coating liquid 22 is coated to serve as a second layer, whereby the behavior of the entire assembly of coating liquids in the coating region can be stabilized. Moreover, shock arising by merging of the coating liquid 22 with the coating liquid 21 on the supporting substrate 20 can be attenuated.

The coating liquid 21 for the lowermost layer serves to prevent the orienting properties of the coating liquids 22 and 23 from being degraded. The presence of the coating liquid 21 contributes to provision of an advantageous effect for delaying substantial solidification of the coating liquids 22 and 23 each of which is prepared as a magnetic coating liquid.

Since each of the coating liquids 22 and 23 is coated to form a layer having a very small thickness, their drying and solidification are achieved very quickly. However, not only due to the wetting effect of the coating liquid 21 on the lowermost layer but also due to the delayed drying of the coating liquid 21 later than the upper layers, the lowermost layer formed by the coating liquid 21 maintains a flowing ability to serve as a holding base for the upper layers. Thus, magnetic particles in the upper magnetic layers can be oriented when they are subjected to an orienting treatment under the effect of a magnetic force.

As long as each magnetic layer is held in a highly flowable state, there is a possibility that the orienting of the magnetic particles in the orienting treatment will proceed too far. This is not desirable from the viewpoint of the recording and reproducing properties of the magnetic recording medium. For this reason, it is required that orienting of the magnetic particles be adequately delayed. To meet this requirement, the coating liquid 21 serves to allow the magnetic particles to be oriented with delay.

As is apparent from the above description, the coating liquid 21 serves as an orientation controlling layer for effectively orienting the magnetic particles in the magnetic layers each having a very small thickness.

Stable behavior of the liquid along the boundary between adjacent liquid layers (boundary between coated layers) can be reliably maintained by stabilizing the behavior of each coating liquid while maintaining the flowing capability of the coating liquid during each coating operation. In addition, when the flowing capability of each upper magnetic layer is degraded after completion of the coating operation, deterioration of the orienting properties of the magnetic recording medium can be avoided by orienting the magnetic particles in the magnetic layers each having a small thickness. Additionally, since each magnetic layer is hardly affected by vibration of the supporting substrate caused during travelling of the latter, pressure from a drying air stream and similar factors, improvements of the coating speed unattainable by the conventional coating method can easily be achieved without color fluctuation and formation of longitudinally extending stripes on the coated layers. Consequently, the coating apparatus of the present invention can stably provide a magnetic recording medium having multiple layers (inclusive of three or more layers) while exhibiting excellent surface properties and excellent magnetic recording properties.

As described above, the present invention provides a method for simultaneously coating a plurality of different organic-solvent-based coating liquids on a of continuously travelling non-magnetic supporting substrate with the aid of an extrusion-type coating head to form a multi-layered structure having three or more layers, each of the coating liquids being a non-newtonian fluid having fine particles dispersed therein, wherein each coating liquid is continuously injected to form a thin layer and a coating liquid for the lowermost layer is injected to form a dummy layer and wherein the coating liquid other than for the lowermost layer are injected to form thin layers on the dummy layer. Thus, the presence of the coated lowermost layer assures an advantageous effect that the surface properties of the supporting substrate can substantially be improved not only in the case where a coating liquid is injected to form an upper layer having a very small thickness of 1.0 μm or less, but also in the case where the supporting substrate does not have good surface properties. In addition to the liquid sealing effect in the liquid merging region, since the thickness of the assembly of coating liquids is increased by injecting coating liquids to form the upper layers, the behavior of the assembly of coating liquids can be improved in the coated region. Additionally, since the shock caused when the coating liquids for the upper layers merge with the coating liquid for the lowermost layer on the supporting substrate can be attenuated, high speed coating unattainable with the conventional coating method can be achieved with coated layers of a very small thickness. Further, according to the present invention, since each coating step is executed with the aid of a coating head constructed such that it does not include any doctor edge plane which extends past a tangential line extending from the upstream end of an opening portion of each slit to a doctor edge on the downstream side, and, moreover, a coating reference value is employed as a reference for the coating step, provided that a merging angle for merging a coating liquid injected on the upstream side with a coating liquid injected on the downstream side is set to a predetermined angle or less, a coating apparatus can be fabricated very easily.

Furthermore, according to the present invention, since the orienting properties of the magnetic coating liquids for the upper layers can adequately be controlled under the effect of the flowability of the coating liquid for the lowermost layer, in the case where drying and solidification of the magnetic coating liquids are quickly achieved, a suitable delay can be achieved, and, moreover, the orienting of magnetic particles may be achieved by the orienting treatment due to the delay. Thus, the orienting treatment can be conducted to obtain desired properties of the magnetic recording medium. Consequently, a magnetic recording medium having high performance can be produced by employing the coating apparatus of the present invention.

The advantageous effects of the present invention as described above will be clarified with reference to the following examples.

To prepare a coating liquid A (for forming an intermediate layer), components whose chemical composition is shown in Table 1 were put in a ball mill and sufficiently mixed with each other, and thereafter, polyisocyanate of 3 parts by weight was added to the resultant mixture. Subsequently, butyl acetate of 40 parts by weight was added to the mixture which in turn was filtered using a filter having an average pore size of 1 μm to obtain the desired coating liquid A.

TABLE 1

| | |
|---|---|
| Ferromagnetic metal fine particle component Fe/Zn/Ni = 92/4/4 Hc = 1600 Oe, $S_{BET}$ (surface area ratio) = 60 m$^2$/g, acicular rate = 10 | 100 parts by weight |
| vinyl chloride-vinyl acetate copolymer 300 degree of polymerization (D.P.) | 12 parts by weight |
| polyester-polyurethane resin | 3 parts by weight |
| α-alumina particle size = 0.34 μm | 2 parts by weight |
| carbon black particle size = 0.1 μm | 0.5 parts by weight |
| butylstearate | 1 parts by weight |
| stearate acid | 2 parts by weight |
| methyl ethyl ketone | 200 parts by weight |

To prepare a coating liquid B (for forming an uppermost layer), components whose chemical composition is shown in Table 2 were put in the ball mill and sufficiently mixed with each other, and thereafter polyisocyanate of 3 parts by weight was added to the resultant mixture. Subsequently, butyl acetate of 40 parts by weight was added to the mixture, which in turn was filtered using a filter having an average pore size of 1 μm to prepare the desired coating liquid B.

TABLE 2

| | |
|---|---|
| Ferromagnetic metal fine particle component Fe/Zn/Ni = 92/4/4 Hc = 1500 Oe, $S_{BET}$ (surface area ratio) = 58 m$^2$/g, acicular rate = 9.5 | 100 parts by weight |
| vinyl chloride-vinyl acetate copolymer 300 degree of polymerization (D.P.) | 12 parts by weight |

TABLE 2-continued

| | |
|---|---|
| polyester-polyurethane resin | 3 parts by weight |
| α-alumina particle size = 0.54 μm | 1 parts by weight |
| carbon black particle size = 0.1 μm | 1.5 parts by weight |
| butylstearate | 0.5 parts by weight |
| stearate acid | 1 parts by weight |
| methyl ethyl ketone | 200 parts by weight |

To prepare a coating liquid C (for forming a lowermost layer), components of which chemical composition is shown in Table 3 were put in the ball mill and sufficiently mixed with each other, and thereafter, polyisocyanate of 3 parts by weight was added to the resultant mixture. Subsequently, butyl acetate of 40 parts by weight was added to the mixture which in turn was filtered using a filter having an average pore size of 1 μm to prepare the desired coating liquid C.

TABLE 3

| | |
|---|---|
| inorganic particles (TiO$_2$) average 1st particle diameter = 0.05 μm $S_{BET}$ (surface area ratio) = 18 m$^2$/g | 100 parts by weight |
| carbon black particles average 1st particle size 0.018 μm | 20 parts by weight |
| vinyl chloride-vinyl acetate-vinyl alcohol copolymer | 12 parts by weight |
| polyester-polyurethane resin | 5 parts by weight |
| butylstearate | 1 parts by weight |
| stearate acid | 1 parts by weight |
| methyl ethyl ketone | 200 parts by weight |

Coating was performed under the following operative conditions by operating a coating apparatus of the present invention.

supporting substrate: a sheet of polyethylene terephthalate having a thickness of 15 μm coating head: a coating head as shown in FIG. 1 to FIG. 3 was used, and angles $\theta_1$, and $\theta_2$ and angles $\Psi_1$, $\Psi_2$ and $\Psi_3$ and the length of each of doctor edge planes were varied.

coating speed: 200 m/min tension : 20 kgf/m thickness of coated layer: the total thickness of three layers in the dried state was 3 μm width of the coated layer: 500 mm The operative conditions for drying the coated layer after completion of the coating operation were arbitrarily determined corresponding to the coating speed within the range of an air blowing speed of 5 to 10 m/s by employing a process of drying the coated layer by blowing a drying air stream toward a supporting substrate at a substantially right angle relative to the latter through a slit having a width of 4 mm located on the upper side of the supporting substrate. The drying temperature was arbitrarily determined within the range of 40° C. to 110° C.

Evaluation of the coated layer was conducted by orienting magnetic particles employing a conventional method before each coated layer was dried and solidified after completion of the coating operation, preparing samples from the dried coated layer, and then visually observing the state of layer formation both unaided and magnified.

Next, several examples prepared by practicing the coating method for the present invention will be described based on the aforementioned fundamental operative conditions on the assumption that each operative condition was individually determined.

EXAMPLE 1

The effect of the angles $\theta_1$ and $\theta_2$, each defined by adjacent slits on a coated layer having a multi-layered structure, was examined.

Coating operations were performed under conditions that the film thickness (dried film thickness) of the lowermost layer was set to 1.5 μm, the film thickness of an intermediate layer was set to 0.8 μm, the film thickness of the uppermost layer was set to 0.7 μm, the blade tip radius R1 of a first doctor edge plane was set to 5.0 mm, the blade tip radius R2 of a second doctor edge plane was set to 4.0 mm, the blade tip radius R3 of a third doctor edge plane was set to 6.0 mm, the blade tip length α of the first doctor edge plane (approximately equal to the length of the latter) was set to 1.0 mm, the blade tip length β of the second doctor edge plane was set to 1.0 mm, and the blade tip length γ of the third doctor edge plane was set to 2.0 mm.

The results obtained from the foregoing coating operations are shown in Table 4. Specifically, samples were prepared by repeatedly performing coating operations using varioius combinations of the angles $\theta_1$ and $\theta_2$. After completion of the coating operations, results as shown in Table 4 were obtained with these samples. As is apparent from Table 4, the rigidity of each of the intermediate blocks defining the adjacent slits was well maintained. Consequently, each coating operation could be achieved satisfactorily.

TABLE 4

| Slit angle $\theta_1$ | Slit angle $\theta_2$ | Condition | Evaluation |
| --- | --- | --- | --- |
| 15° | 15° | good coating possible | ○ |
| 25° | 15° | good coating possible | ○ |
| 15° | 7° | streaks occurred on topmost layer | x |
| 30° | 30° | good coating possible | ○ |
| 10° | 30° | much variation in width direction | x |

○: good
x: poor

EXAMPLE 2

In this example, the effect of the merging angles $\theta_1$, $\theta_2$ and $\theta_3$ defined by the respective slits on coating operations was examined.

In the case of a sample group A, coating operations were performed under conditions that the film thickness (dried film thickness) of the lowermost layer was set to 1.5 μm, the film thickness of the intermediate layer was set to 0.8 μm, the film thickness of the uppermost layer was set to 0.8 μm, the blade tip radius R1 of the first doctor edge plane was set to 5.0 mm, the blade tip radius R2 of the second doctor edge plane was set to 4.0 mm, the blade tip radius R3 of the third doctor edge plane was set to 6.0 mm, the blade tip thickness α of the first doctor edge plane (approximately equal to the length of the latter) was set to 1.0 mm, the blade tip thickness β of the second doctor edge plane was set to 1.0 mm, and the blade tip thickness γ of the third doctor edge plane was set to 2.0 mm.

In the case of a sample group B, coating operations were performed under conditions that the film thickness (dried film thickness) of the lowermost layer was set to 2.4 μm, the film thickness of the intermediate layer was set to 0.4 μm, and the film thickness of the uppermost layer was set to 0.2 μm, while other conditions were the same as those of the sample group A.

In the case of a sample group C, coating operations were performed under conditions that the film thickness (dried film thickness of the lowermost layer was set to 2.0 μm, the film thickness of the intermediate layer was set to 0.4 μm, and the film thickness of the uppermost layer was set to 0.7 μm, while other conditions were the same as those of the sample group A.

The results derived from the aforementioned coating operations are shown in Table 5.

TABLE 5

| Thickness structure | Merging angle $I_1$ | Merging angle $I_2$ | Merging angle $I_3$ | Condition | Evaluation |
| --- | --- | --- | --- | --- | --- |
| Group A | 60° | 95° | 130° | good coating possible | ○ |
| | 65° | 100° | 135° | good coating possible | ○ |
| | 65° | 120° | 165° | good coating possible | ○ |
| | 90° | 140° | 170° | uppermost layer peeled away | x |
| Group B | 60° | 95° | 130° | good coating possible | ○ |
| | 65° | 100° | 135° | uneven coating, but coating possible | ○△ |
| | 65° | 120° | 165° | uppermost layer peeled away | x |
| | 95° | 163° | 172° | streaks occurred on entire surface | x |
| Group C | 60° | 140° | 130° | good coating possible | ○ |
| | | 165° | | coating tends to be uneven, but coating possible | ○△ |
| | | 170° | | uneven coating occurred over entire surface | x |
| | | 100° | 150° | good coating possible | ○ |
| | | | 165° | many streaks in uppermost layer | △ |
| | | | 170° | uppermost layer peeled away | x |

○: good
△: fair
x: poor

As is apparent from Table 5, when the merging angles $\Psi_2$ and $\Psi_3$ were set to 165° or less, each coating operation could satisfactorily be achieved even though each coating film had a very small thickness.

EXAMPLE 3

Samples were prepared under conditions that both the slit angles $\theta_1$ and $\theta_2$ were set to 30° while other conditions were the same as those of Example 1.

As a comparative example, samples were prepared under the condition that the lowermost layer was not coated on the supporting substrate, while other conditions were the same as those of Example 1.

With two kinds of samples as mentioned above, the orienting state of each sample was visually observed with a microscope. The orienting state of each sample prepared according to the present invention was good, but the orienting state of each sample prepared as a comparative example wherein the lowermost layer serving as a dummy layer was not coated on the supporting substrate was very poor. It is considered that the foregoing result derived from the microscopic observation is attributable to the fact that the uppermost layer and the intermediate layer each having a very small thickness were very quickly dried, resulting in formation of each coated layer in an acceptable oriented state being obstructed.

EXAMPLE 4

In this example, the effect of the thicknesses $\alpha$, $\beta$ and $\gamma$ of the respective doctor edge planes (approximately equal to the length of each doctor edge plane) on each coating operation was examined.

Coating operations were performed under conditions that the film thickness (dried film thickness) of the lowermost layer was set to 1.5 $\mu$m, the film thickness of the intermediate layer was set to 0.8 $\mu$m, the film thickness of the uppermost layer was set to 0.7 $\mu$m, the angles $\theta_1$ and $\theta_2$ each defined by adjacent slits were set to 30°, the merging angle $\Psi_1$ was set to 60°, the merging angle $\Psi_2$ was set to 95°, and the merging angle $\Psi_3$ was set to 130° while the blade tip radiuses R1, R2 and R3 and the blade tip thickness $\alpha$, $\beta$ and $\gamma$ were varied.

The results derived from the coating operations are shown in Table 6.

said extrusion type coating head, a coating liquid for forming at least a lowermost layer being a non-magnetic liquid; and wherein each of said plurality of different organic-solvent-based coating liquids beginning with said lowermost layer are independently extruded from respective ones of said slits in said extrusion type coating head and smoothed by respective doctor edges, each having a respective length and radius of curvature, to a merging region with merging angle to provide for simultaneous coating of said plurality of different organic-solvent-based coating of said plurality of different organic-solvent-based coating liquids onto said strip of continuously travelling non-magnetic supporting substrate, the following relationships being satisfied;

$\Psi_1 < 90°$
$90° < \Psi_2 < 165°$
$120° < \Psi_3 < 165°$ wherein:

$\Psi_1$ is merging angle of a first of said coating liquids,
$\Psi_2$ is merging angle of a second of said coating liquids,
$\Psi_3$ is merging angle of a third of said coating liquids.

2. The method according to claim 1, wherein angles defined by center extension lines of adjacent slits have a minimum value of 10°.

3. The method according to claim 2, wherein a length of each doctor edge is in a range of 0.3 mm to 5 mm as viewed in a direction of travelling of said non-magnetic supporting substrate.

4. The method of claim 1, wherein sid lowermost layer contains inorganic material powder.

5. The method of claim 1, wherein said multi-layered structure comprises a first outer layer formed on said lowermost layer and a second outer layer formed between said first outer layer and said lowermost layer, said first and second outer layers comprising magnetic layers, respectively.

6. The method of claim 5, wherein said first outer layer has a content of a magnetizable metallic material powder which is lower than that said second outer layer.

7. The method of claim 1, wherein each of said doctor edges has a radius of said curvature in the range of 0.5 to 10 cm.

8. The method of claim 5, wherein each of said magnetic layers has a thickness of 1.0 $\mu$m or less.

TABLE 6

| Blade tip radius R1 | Blade tip radius R2 | Blade tip radius R3 | Blade tip thickness $\alpha$ | Blade tip thickness $\beta$ | Blade tip thickness $\gamma$ | Condition | Evaluation |
| --- | --- | --- | --- | --- | --- | --- | --- |
| 5 mm | 4 mm | 6 mm | 1 mm | 1 mm | 2 mm | good coating possible | o |
| 5 mm | 4 mm | 6 mm. | 3 mm | 1 mm | 3 mm | good coating possible | o |
| 5 mm | 4 mm | 6 mm | 3 mm | 0.2 mm | 3 mm | uneven coating occurred maybe due to uneven surface active | x |
| 5 mm | 4 mm | 6 mm | 3 mm | 0.2 mm | 6 mm | rib-like uneven coating occurred | x |
| 2 mm | 3 mm | 6 mm | 0.5 mm | 1.5 mm | 3 mm | good coating possible | o |
| 2 mm | 3 mm | 6 mm | 0.5 mm | 1.5 mm | 5 mm | coating possible, but thin vertical streaks occurred | Δo |
| 2 mm | 3 mm | 6 mm | 0.2 mm | 1.5 mm | 5 mm | uneven coating occurred maybe due to uneven surface active | Δx |
| 2 mm | 3 mm | 6 mm | 0.5 mm | 1.5 mm | 10 mm | vertical streaks occurred | x |

What is claimed is:

1. In a method for simultaneously coating a plurality of different organic-solvent-based coating liquids on a strip of continuously travelling non-magnetic supporting substrate through an extrusion coating head to form a multi-layered structure having three or more layers, each of said organic-solvent-based coating liquids being a non-newtonian fluid having fine particles dispersed therein, the improvement wherein said plurality of different organic-solvent-based coating liquids are simultaneously extruded through respective slits, each of said slits being arranged at a respective inclination angle in